(12) United States Patent
Higashitani et al.

(10) Patent No.: US 11,427,212 B2
(45) Date of Patent: Aug. 30, 2022

(54) AUTONOMOUS DRIVING CONTROL SYSTEM FOR VEHICLE

(71) Applicant: DENSO CORPORATION, Kariya (JP)

(72) Inventors: Mitsuharu Higashitani, Kariya (JP); Noriaki Ikemoto, Kariya (JP); Tomomi Hase, Kariya (JP)

(73) Assignee: DENSO CORPORATION, Kariya (JP)

( * ) Notice: Subject to any disclaimer, the term of this patent is extended or adjusted under 35 U.S.C. 154(b) by 210 days.

(21) Appl. No.: 16/580,201

(22) Filed: Sep. 24, 2019

(65) Prior Publication Data

US 2020/0017115 A1 Jan. 16, 2020

Related U.S. Application Data

(63) Continuation of application No. PCT/JP2018/006185, filed on Feb. 21, 2018.

(30) Foreign Application Priority Data

Apr. 19, 2017 (JP) .............................. JP2017-082433

(51) Int. Cl.
*B60W 50/038* (2012.01)
*B60R 16/023* (2006.01)
(Continued)

(52) U.S. Cl.
CPC ....... *B60W 50/038* (2013.01); *B60R 16/0232* (2013.01); *B60W 50/0205* (2013.01);
(Continued)

(58) Field of Classification Search
CPC .......... B60W 50/038; B60W 50/0205; B60W 2050/0072; B60W 2050/021;
(Continued)

(56) References Cited

U.S. PATENT DOCUMENTS 9,616,896 B1* 4/2017 Letwin ................ B60W 50/082
9,855,905 B2* 1/2018 Nakajima ............. F02N 11/087
(Continued)

FOREIGN PATENT DOCUMENTS

JP 2001-035335 A 2/2001
JP 2015-182711 A 10/2015

*Primary Examiner* — Abby Y Lin
*Assistant Examiner* — Esvinder Singh
(74) *Attorney, Agent, or Firm* — Oliff PLC

(57) ABSTRACT

An autonomous driving control system is configured to perform autonomous driving of a vehicle. The autonomous driving control system includes: an electric power supply circuit including a plurality of electric power supplies, electric power supply lines respectively belonging to a plurality of systems and a relay device; a fault detector configured to detect a fault state of the relay device; an electric power supply controller configured to control the electric power supply circuit; and an autonomous driving control unit provided to control the autonomous driving of the vehicle. The autonomous driving control unit is configured to perform, upon detection by the fault detector of occurrence of a fault corresponding to a specific fault pattern in the relay device, a restricted autonomous driving control in which part of a control function of the autonomous driving is restricted compared to when no fault corresponding to the specific fault pattern is detected.

5 Claims, 22 Drawing Sheets

(51) Int. Cl.
  *B60W 50/02* (2012.01)
  *G05D 1/00* (2006.01)
  *G07C 5/08* (2006.01)
  *B60W 50/00* (2006.01)

(52) U.S. Cl.
  CPC ......... *G05D 1/0088* (2013.01); *G07C 5/0808* (2013.01); *B60W 2050/0072* (2013.01); *B60W 2050/021* (2013.01)

(58) Field of Classification Search
  CPC ............ B60W 30/1819; B60W 20/50; B60W 2050/0292; B60W 60/0018; B60W 60/00186; B60W 60/0023; B60W 60/0053; B60W 60/0055; B60W 60/0059; B60W 60/007; B60R 16/0232; B60R 16/03; B60R 16/0231; B60R 16/04; G05D 1/0088; G07C 5/0808; H02J 7/1423; H02J 1/10; H02J 1/084; H02J 7/0024; H02J 3/007; H02J 1/12; H02J 3/38; H02J 13/00036; H01H 47/002; H01H 2071/044; G05B 23/0205; G05B 23/0208; G05B 23/0291
  See application file for complete search history.

(56) References Cited

U.S. PATENT DOCUMENTS

| | | | |
|---|---|---|---|
| 2014/0132226 A1* | 5/2014 | Sakamoto | B60L 3/0046 320/166 |
| 2018/0238968 A1* | 8/2018 | Wada | F02N 11/10 |
| 2019/0036325 A1* | 1/2019 | Jyumonji | H03K 17/00 |

* cited by examiner

FIG.4

RELAY STATE THAT PERMITS AUTONOMOUS DRIVING (FIRST EMBODIMENT)

| No. | RELAY | | | | |
|---|---|---|---|---|---|
| | 631 | 632 | 633 | 634 | 635 |
| 1 | NORMAL | NORMAL | NORMAL | NORMAL | NORMAL |
| 2 | NORMAL | NORMAL | NORMAL | NORMAL | STUCK-OFF |
| 3 | NORMAL | NORMAL | NORMAL | STUCK-ON | NORMAL |
| 4 | NORMAL | NORMAL | NORMAL | STUCK-ON | STUCK-OFF |
| 5 | NORMAL | NORMAL | STUCK-ON | NORMAL | NORMAL |
| 6 | NORMAL | NORMAL | STUCK-ON | NORMAL | STUCK-OFF |
| 7 | NORMAL | NORMAL | STUCK-ON | STUCK-ON | NORMAL |
| 8 | NORMAL | NORMAL | STUCK-ON | STUCK-ON | STUCK-OFF |
| 9 | NORMAL | STUCK-ON | NORMAL | STUCK-ON | NORMAL |
| 10 | NORMAL | STUCK-ON | NORMAL | STUCK-ON | STUCK-OFF |
| 11 | NORMAL | STUCK-ON | STUCK-ON | NORMAL | NORMAL |
| 12 | NORMAL | STUCK-ON | STUCK-ON | NORMAL | STUCK-OFF |
| 13 | NORMAL | STUCK-ON | STUCK-ON | STUCK-ON | NORMAL |
| 14 | NORMAL | STUCK-ON | STUCK-ON | STUCK-ON | STUCK-OFF |
| 15 | STUCK-ON | NORMAL | STUCK-ON | NORMAL | NORMAL |
| 16 | STUCK-ON | NORMAL | STUCK-ON | NORMAL | STUCK-OFF |
| 17 | STUCK-ON | NORMAL | STUCK-ON | STUCK-ON | NORMAL |
| 18 | STUCK-ON | NORMAL | STUCK-ON | STUCK-ON | STUCK-OFF |
| 19 | STUCK-ON | STUCK-ON | STUCK-ON | STUCK-ON | NORMAL |
| 20 | STUCK-ON | STUCK-ON | STUCK-ON | STUCK-ON | STUCK-OFF |

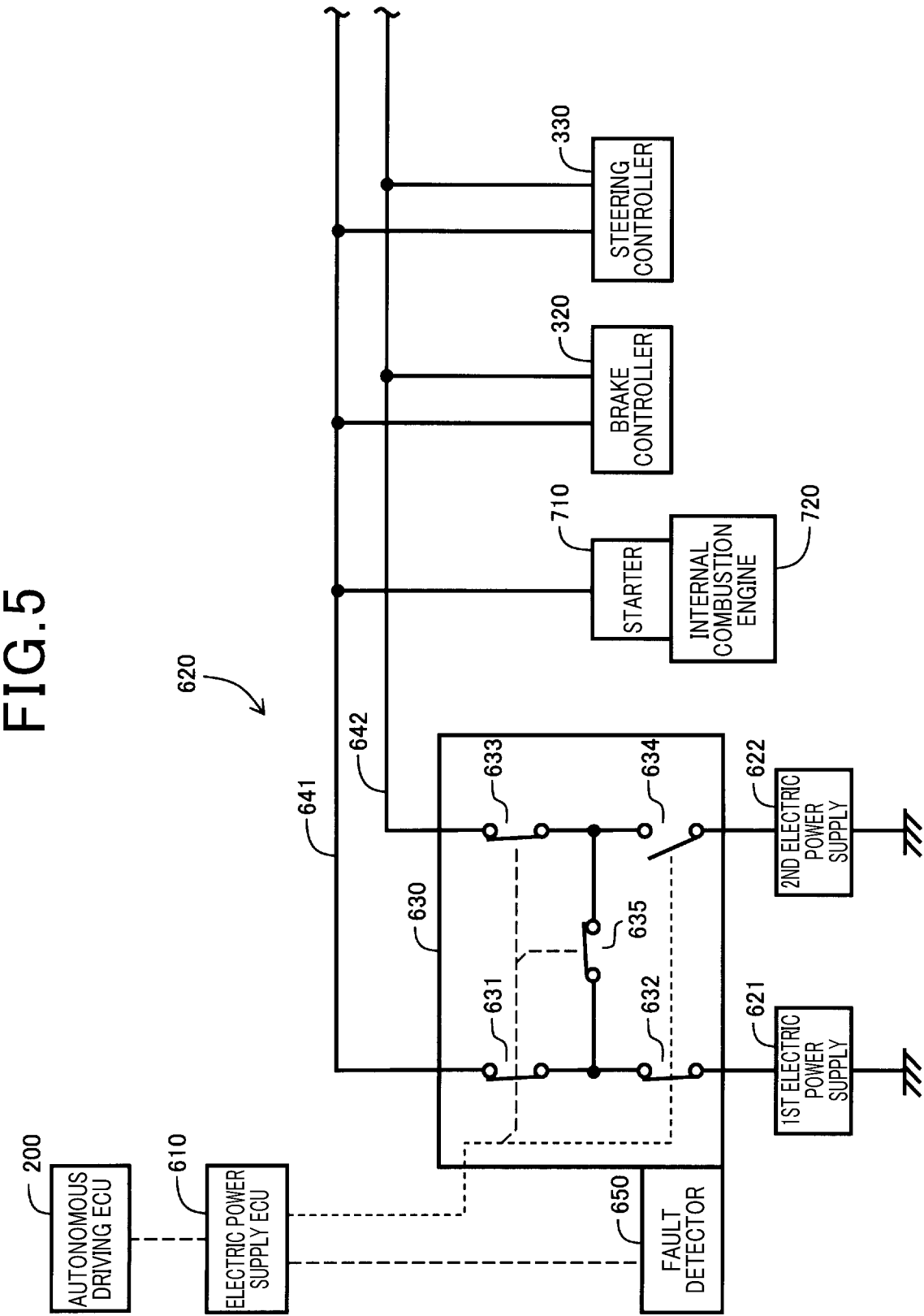

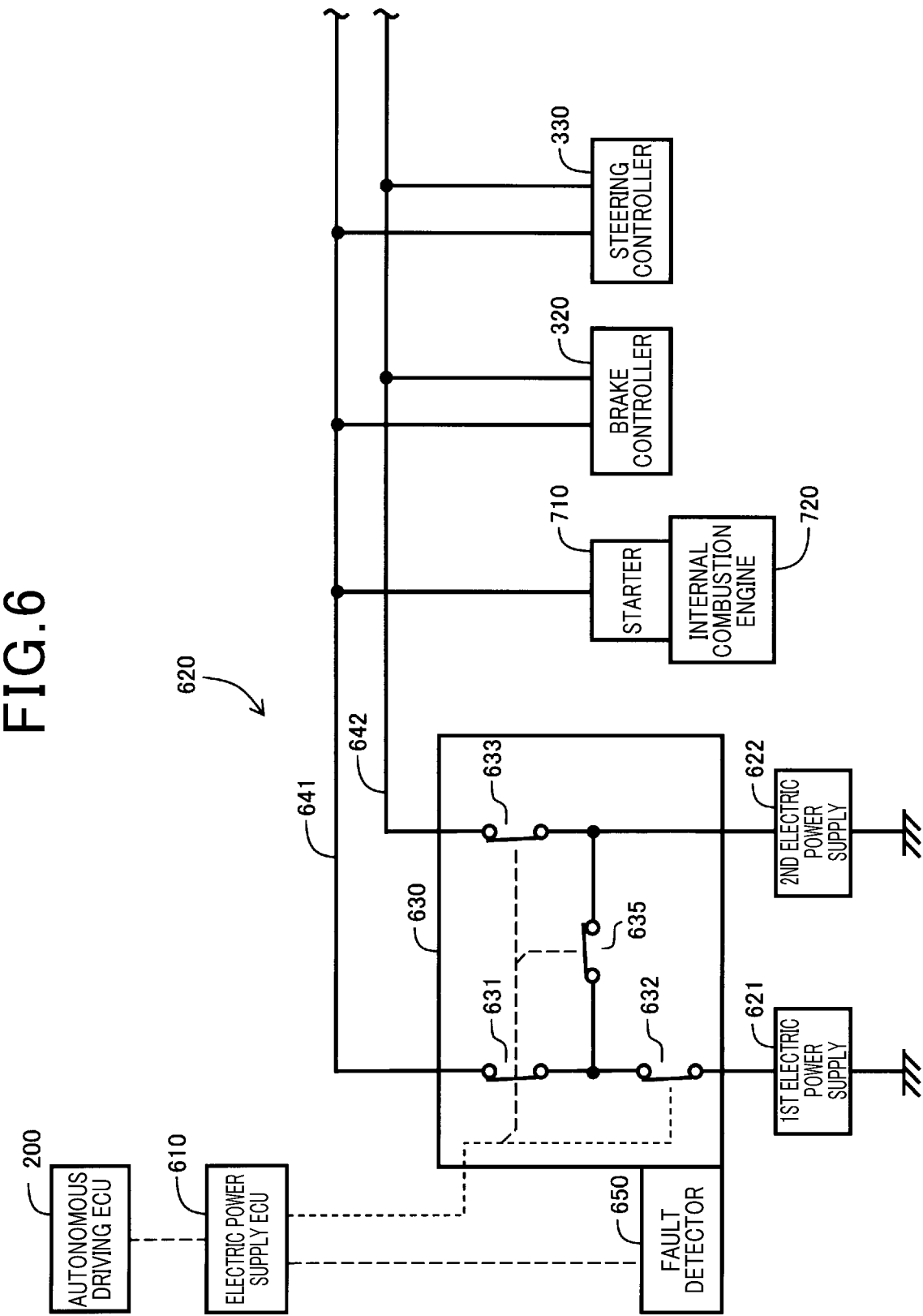

FIG.7

RELAY STATE THAT PERMITS AUTONOMOUS DRIVING (THIRD EMBODIMENT)

| No. | RELAY | | | |
|---|---|---|---|---|
| | 631 | 632 | 633 | 635 |
| 1 | NORMAL | NORMAL | NORMAL | NORMAL |
| 2 | NORMAL | NORMAL | NORMAL | STUCK-OFF |
| 3 | NORMAL | NORMAL | STUCK-ON | NORMAL |
| 4 | NORMAL | NORMAL | STUCK-ON | STUCK-OFF |
| 5 | NORMAL | STUCK-ON | NORMAL | NORMAL |
| 6 | NORMAL | STUCK-ON | NORMAL | STUCK-OFF |
| 7 | NORMAL | STUCK-ON | STUCK-ON | NORMAL |
| 8 | NORMAL | STUCK-ON | STUCK-ON | STUCK-OFF |
| 9 | STUCK-ON | NORMAL | STUCK-ON | NORMAL |
| 10 | STUCK-ON | NORMAL | STUCK-ON | STUCK-OFF |
| 11 | STUCK-ON | STUCK-ON | STUCK-ON | NORMAL |
| 12 | STUCK-ON | STUCK-ON | STUCK-ON | STUCK-OFF |
| 13 | STUCK-ON | NORMAL | NORMAL | NORMAL |
| 14 | STUCK-ON | NORMAL | NORMAL | STUCK-OFF |
| 15 | STUCK-ON | STUCK-ON | NORMAL | NORMAL |
| 16 | STUCK-ON | STUCK-ON | NORMAL | STUCK-OFF |

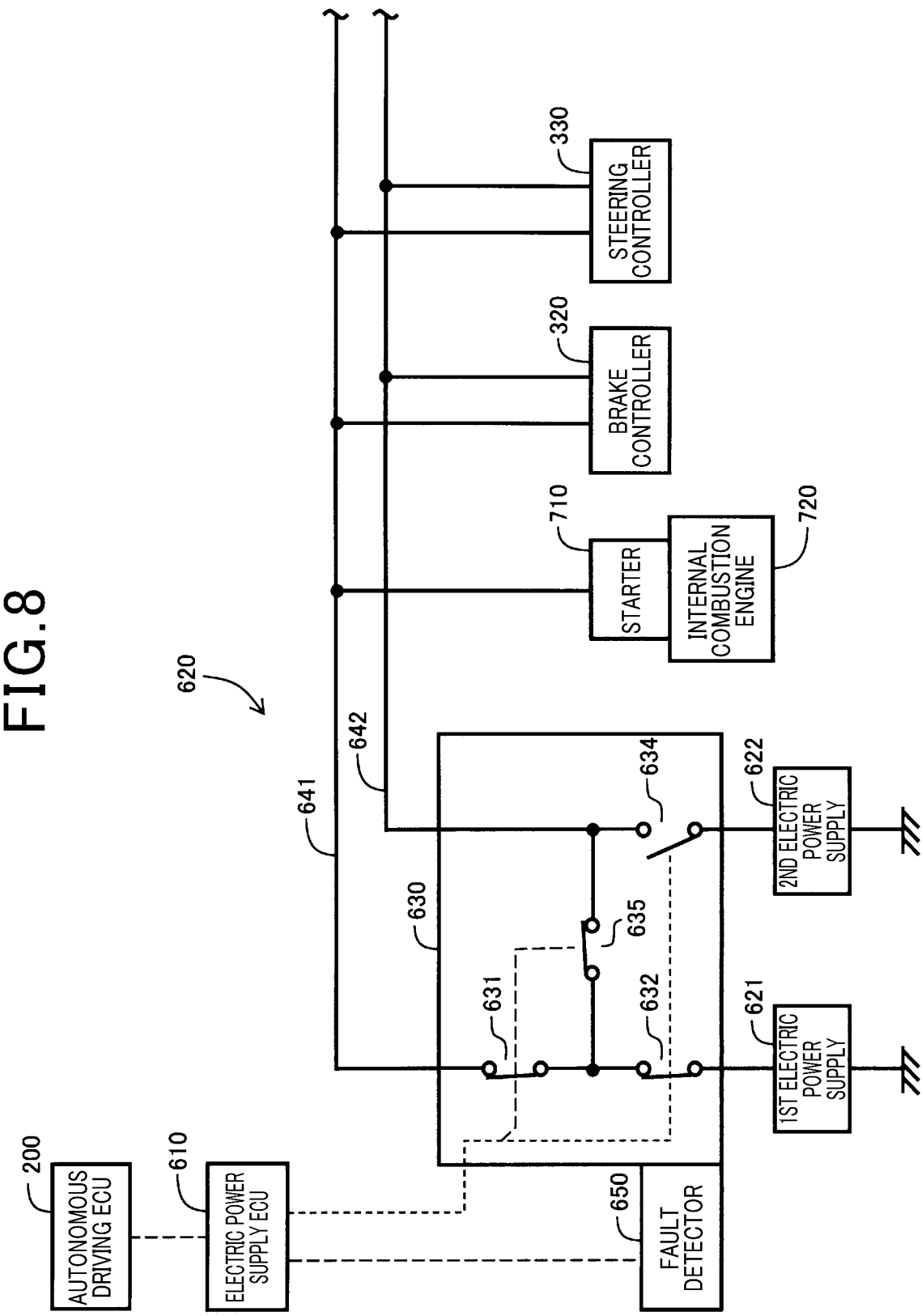

FIG.9

RELAY STATE THAT PERMITS AUTONOMOUS DRIVING (FOURTH EMBODIMENT)

| No. | RELAY | | | |
|---|---|---|---|---|
| | 631 | 632 | 634 | 635 |
| 1 | NORMAL | NORMAL | NORMAL | NORMAL |
| 2 | NORMAL | NORMAL | NORMAL | STUCK-OFF |
| 3 | NORMAL | NORMAL | STUCK-ON | NORMAL |
| 4 | NORMAL | NORMAL | STUCK-ON | STUCK-OFF |
| 5 | NORMAL | STUCK-ON | NORMAL | NORMAL |
| 6 | NORMAL | STUCK-ON | NORMAL | STUCK-OFF |
| 7 | NORMAL | STUCK-ON | STUCK-ON | NORMAL |
| 8 | NORMAL | STUCK-ON | STUCK-ON | STUCK-OFF |
| 9 | STUCK-ON | NORMAL | NORMAL | NORMAL |
| 10 | STUCK-ON | NORMAL | NORMAL | STUCK-OFF |
| 11 | STUCK-ON | NORMAL | STUCK-ON | NORMAL |
| 12 | STUCK-ON | NORMAL | STUCK-ON | STUCK-OFF |
| 13 | STUCK-ON | STUCK-ON | STUCK-ON | NORMAL |
| 14 | STUCK-ON | STUCK-ON | STUCK-ON | STUCK-OFF |
| 15 | STUCK-ON | STUCK-ON | NORMAL | NORMAL |
| 16 | STUCK-ON | STUCK-ON | NORMAL | STUCK-OFF |

FIG.10B

RELAY STATE THAT PERMITS AUTONOMOUS DRIVING (FIFTH EMBODIMENT)

| No. | RELAY | | |
|---|---|---|---|
| | 631 | 632 | 635 |
| 1 | NORMAL | NORMAL | NORMAL |
| 2 | NORMAL | NORMAL | STUCK-OFF |
| 3 | NORMAL | STUCK-ON | NORMAL |
| 4 | NORMAL | STUCK-ON | STUCK-OFF |
| 5 | STUCK-ON | NORMAL | NORMAL |
| 6 | STUCK-ON | NORMAL | STUCK-OFF |
| 7 | STUCK-ON | STUCK-ON | NORMAL |
| 8 | STUCK-ON | STUCK-ON | STUCK-OFF |

FIG.11B

RELAY STATE THAT PERMITS AUTONOMOUS DRIVING (SIXTH EMBODIMENT)

| No. | RELAY | | |
|---|---|---|---|
| | 631 | 634 | 635 |
| 1 | NORMAL | NORMAL | NORMAL |
| 2 | NORMAL | NORMAL | STUCK-OFF |
| 3 | NORMAL | STUCK-ON | NORMAL |
| 4 | NORMAL | STUCK-ON | STUCK-OFF |
| 5 | STUCK-ON | STUCK-ON | NORMAL |
| 6 | STUCK-ON | STUCK-ON | STUCK-OFF |
| 7 | STUCK-ON | NORMAL | NORMAL |
| 8 | STUCK-ON | NORMAL | STUCK-OFF |

FIG.12B

RELAY STATE THAT PERMITS AUTONOMOUS DRIVING (SEVENTH EMBODIMENT)

| No. | RELAY | | |
|---|---|---|---|
| | 632 | 634 | 635 |
| 1 | NORMAL | NORMAL | NORMAL |
| 2 | NORMAL | NORMAL | STUCK-OFF |
| 3 | NORMAL | STUCK-ON | NORMAL |
| 4 | NORMAL | STUCK-ON | STUCK-OFF |
| 5 | STUCK-ON | STUCK-ON | NORMAL |
| 6 | STUCK-ON | STUCK-ON | STUCK-OFF |
| 7 | STUCK-ON | NORMAL | NORMAL |
| 8 | STUCK-ON | NORMAL | STUCK-OFF |

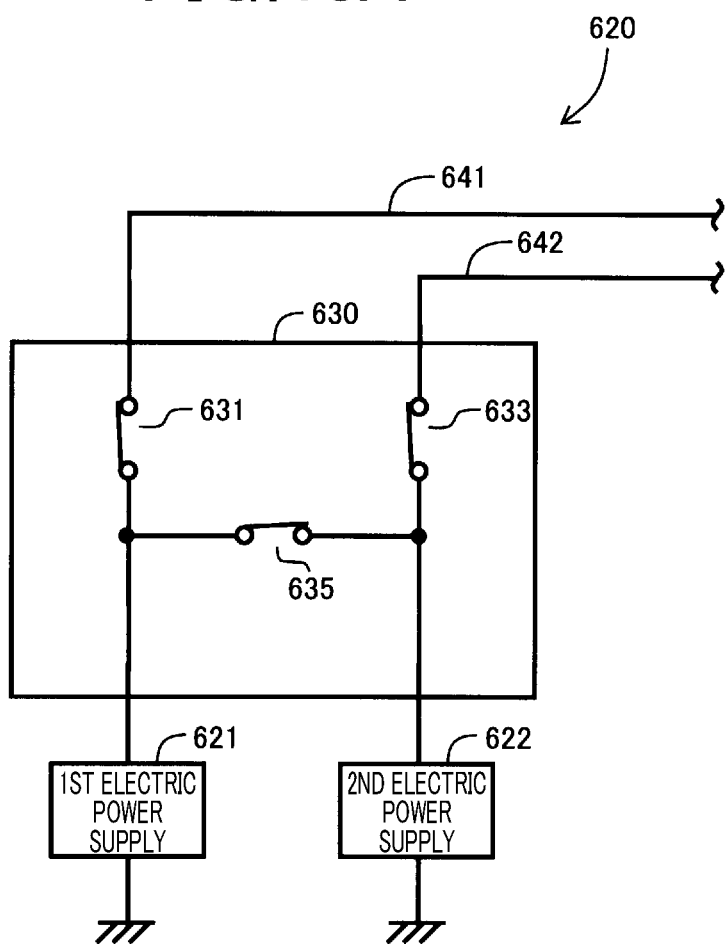

FIG.13B

RELAY STATE THAT PERMITS AUTONOMOUS DRIVING (EIGHTH EMBODIMENT)

| No. | RELAY | | |
|---|---|---|---|
| | 631 | 633 | 635 |
| 1 | NORMAL | NORMAL | NORMAL |
| 2 | NORMAL | NORMAL | STUCK-OFF |
| 3 | NORMAL | STUCK-ON | NORMAL |
| 4 | NORMAL | STUCK-ON | STUCK-OFF |
| 5 | STUCK-ON | STUCK-ON | NORMAL |
| 6 | STUCK-ON | STUCK-ON | STUCK-OFF |
| 7 | STUCK-ON | NORMAL | NORMAL |
| 8 | STUCK-ON | NORMAL | STUCK-OFF |

RELAY STATE THAT PERMITS AUTONOMOUS DRIVING (NINTH EMBODIMENT)

| No. | RELAY | |
|---|---|---|
| | 631 | 635 |
| 1 | NORMAL | NORMAL |
| 2 | NORMAL | STUCK-OFF |
| 3 | STUCK-ON | NORMAL |
| 4 | STUCK-ON | STUCK-OFF |

RELAY STATE THAT PERMITS AUTONOMOUS DRIVING (TENTH EMBODIMENT)

| No. | RELAY | |
|---|---|---|
| | 632 | 635 |
| 1 | NORMAL | NORMAL |
| 2 | NORMAL | STUCK-OFF |
| 3 | STUCK-ON | NORMAL |
| 4 | STUCK-ON | STUCK-OFF |

RELAY STATE THAT PERMITS AUTONOMOUS DRIVING (ELEVENTH EMBODIMENT)

| No. | RELAY | |
|---|---|---|
| | 631 | 633 |
| 1 | NORMAL | NORMAL |
| 2 | NORMAL | STUCK-ON |
| 3 | STUCK-ON | STUCK-ON |
| 4 | STUCK-ON | NORMAL |

RELAY STATE THAT PERMITS AUTONOMOUS DRIVING (TWELFTH EMBODIMENT)

| No. | RELAY |
|---|---|
| | 635 |
| 1 | NORMAL |
| 2 | STUCK-OFF |

RELAY STATE THAT PERMITS AUTONOMOUS DRIVING (THIRTEENTH EMBODIMENT)

| No. | RELAY 631 |
|---|---|
| 1 | NORMAL |
| 2 | STUCK-ON |

AUTONOMOUS DRIVING CONTROL SYSTEM FOR VEHICLE

CROSS-REFERENCE TO RELATED APPLICATIONS

The present application is a continuation application of International Application No. PCT/JP2018/6185 filed on Feb. 21, 2018, which is based on and claims priority from Japanese Patent Application No. 2017-82433 filed on Apr. 19, 2017. The contents of these applications are hereby incorporated by reference in their entirety into the present application.

BACKGROUND

1 Technical Field

The present disclosure relates to autonomous driving control systems for vehicles.

2 Description of Related Art

There are known vehicles which have an idle stop function. Moreover, there is also known a technique according to which a ground-side electric current path is switched using a relay, so as to prevent a voltage drop due to inrush current during a restart of an engine after an idle stop.

SUMMARY

According to the present disclosure, there is provided an autonomous driving control system which is configured to perform autonomous driving of a vehicle. The autonomous driving control system includes: an electric power supply circuit including a plurality of electric power supplies, electric power supply lines respectively belonging to a plurality of systems and a relay device, the electric power supply lines being connectable to the electric power supplies to supply electric power to specific accessories of the vehicle, the relay device being configured to change a connection state between the electric power supplies and the electric power supply lines; a fault detector configured to detect a fault state of the relay device; an electric power supply controller configured to control the electric power supply circuit; and an autonomous driving control unit provided to control the autonomous driving of the vehicle. The autonomous driving control unit is configured to perform, upon detection by the fault detector of occurrence of a fault corresponding to a specific fault pattern in the relay device, a restricted autonomous driving control in which part of a control function of the autonomous driving is restricted compared to when no fault corresponding to the specific fault pattern is detected.

BRIEF DESCRIPTION OF THE DRAWINGS

FIG. 4 is a tabular representation illustrating relay states that permit autonomous driving according to the first embodiment.

FIG. 5 is an explanatory diagram illustrating the configuration of an electric power supply circuit according to a second embodiment.

FIG. 6 is an explanatory diagram illustrating the configuration of an electric power supply circuit according to a third embodiment.

FIG. 7 is a tabular representation illustrating relay states that permit autonomous driving according to the third embodiment.

FIG. 8 is an explanatory diagram illustrating the configuration of an electric power supply circuit according to a fourth embodiment.

FIG. 9 is a tabular representation illustrating relay states that permit autonomous driving according to the fourth embodiment.

FIG. 10B is a tabular representation illustrating relay states that permit autonomous driving according to the fifth embodiment.

FIG. 11B is a tabular representation illustrating relay states that permit autonomous driving according to the sixth embodiment.

FIG. 12B is a tabular representation illustrating relay states that permit autonomous driving according to the seventh embodiment.

FIG. 13A is an explanatory diagram illustrating the configuration of an electric power supply circuit according to an eighth embodiment.

FIG. 13B is a tabular representation illustrating relay states that permit autonomous driving according to the eighth embodiment.

DESCRIPTION OF EMBODIMENTS

Figure 1:
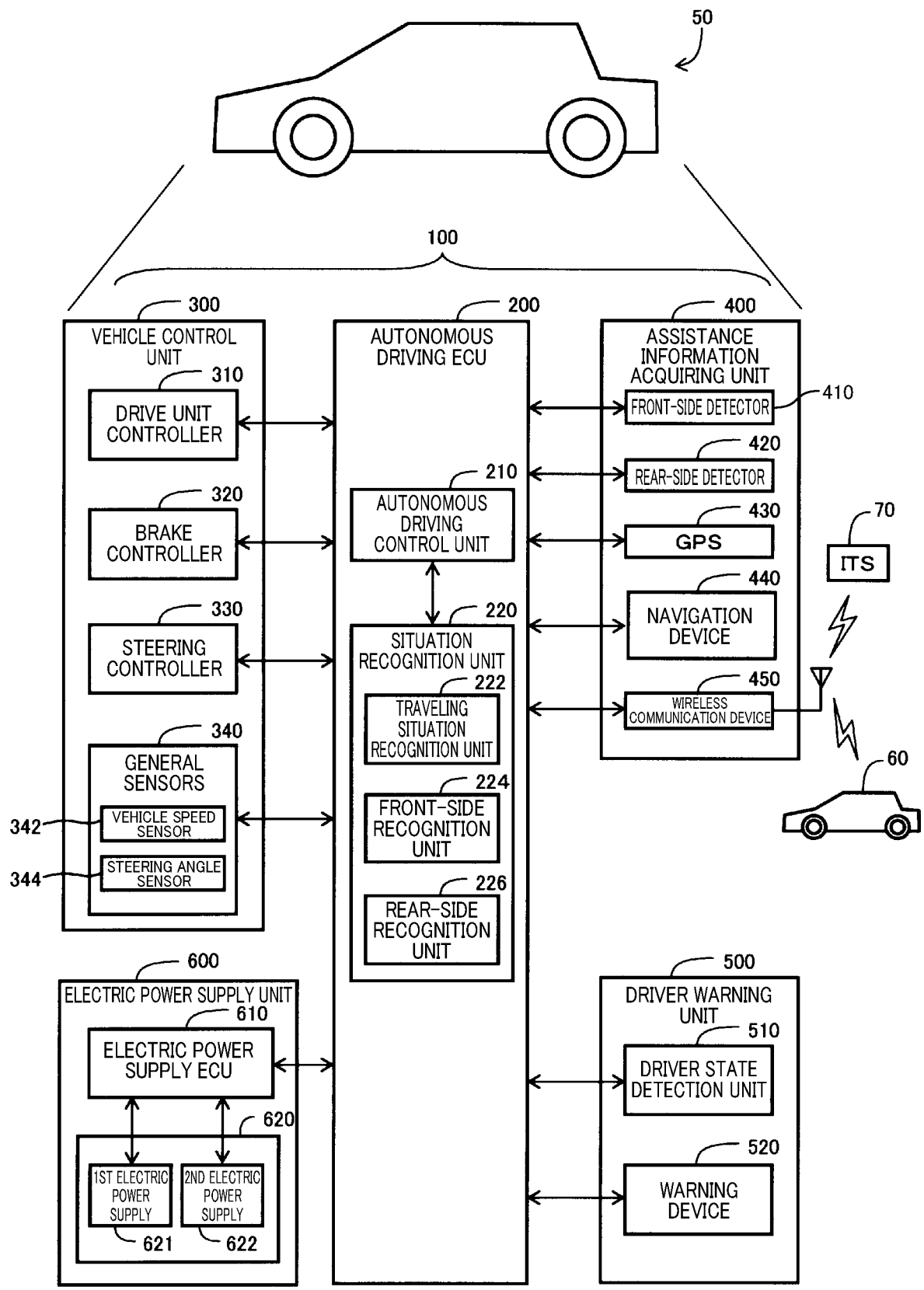
FIG. 1 is an explanatory diagram illustrating the configuration of an autonomous driving control system according to a first embodiment.

The prior art (see, for example, Japanese Patent Application Publication No. JP2015182711A) fails to disclose or even suggest problems caused by occurrence of a fault or malfunction in electric power supply systems during autonomous driving of a vehicle. That is, it has not been investigated in the prior art how to permit autonomous driving when a fault or malfunction has occurred in the electric power supply systems.

In contrast, in the above-described autonomous driving control system according to the present disclosure, part of the control function of the autonomous driving is restricted upon occurrence of a fault corresponding to the specific fault pattern in the relay device. Consequently, even if a fault or malfunction occurs in the electric power supply systems during the autonomous driving, it is still possible to reduce the possibility of the autonomous driving causing unstable vehicle behavior.

Exemplary embodiments will be described hereinafter with reference to FIGS. 1-18B. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

As shown in FIG. 1, a vehicle 50 according to the first embodiment is equipped with an autonomous driving control system 100. The autonomous driving control system 100 includes an autonomous driving ECU (Electronic Control Unit) 200, a vehicle control unit 300, an assistance information acquiring unit 400, a driver warning unit 500, and an electric power supply unit 600. It should be noted that the vehicle 50 is also referred to as "own vehicle 50" hereinafter.

The autonomous driving ECU 200 is a circuit including a CPU and memories. The autonomous driving ECU 200 executes a computer program stored in a nonvolatile storage medium, thereby functioning as both an autonomous driving control unit 210 that controls autonomous driving of the vehicle 50 and a situation recognition unit 220 that recognizes a situation regarding the vehicle 50. Functions of the situation recognition unit 220 will be described later.

The vehicle control unit 300, which is configured to perform various controls for driving the vehicle 50, is employed for both autonomous driving and manual driving. The vehicle control unit 300 includes a drive unit controller 310, a brake controller 320, a steering controller 330 and general sensors 340. The drive unit controller 310 has a function of controlling a drive unit (not shown) for driving wheels of the vehicle 50. The drive unit for driving the wheels of the vehicle 50 may be implemented by at least one of an internal combustion engine and an electric motor. The brake controller 320 performs brake control on the vehicle 50. For example, the brake controller 320 is configured as an ECB (Electronically Controlled Brake) system. The steering controller 330 controls a steering angle of the wheels of the vehicle 50. It should be noted that the term "steering angle" used in the present disclosure denotes an average steering angle of two front wheels of the vehicle 50. For example, the steering controller 330 is configured as an electric power steering system (EPS). The general sensors 340, which include a vehicle speed sensor 342 and a steering angle sensor 344, are general sensors necessary for driving the vehicle 50. The general sensors 340 include sensors employed for both autonomous driving and manual driving.

The assistance information acquiring unit 400 is provided to acquire various types of assistance information for assisting autonomous driving. The assistance information acquiring unit 400 includes a front-side detector 410, a rear-side detector 420, a GPS device 430, a navigation device 440 and a wireless communication device 450. The navigation device 440 has a function of determining a scheduled travel route for autonomous driving on the basis of a destination and the location of the own vehicle 50 detected by the GPS device 430. To determine or alter the scheduled travel route, any other sensor such as a gyroscope sensor may be employed in addition to the GPS device 430. The front-side detector 410 acquires information regarding a situation of objects and road facilities (traffic lanes, traffic intersections, traffic signals and the like) present in front of the own vehicle 50. The rear-side detector 420 acquires information regarding objects and road facilities present behind the own vehicle 50. Each of the front-side detector 410 and the rear-side detector 420 may be implemented by at least one detecting device selected from a variety of detecting devices such as a camera, a laser radar and a millimeter-wave radar. The wireless communication device 450 is capable of exchanging, with an intelligent transport system 70 via wireless communication, situation information on a situation of the own vehicle 50 and a surrounding situation. The wireless communication device 450 is also capable of exchanging situation information with another vehicle 60 via inter-vehicle communication and with road-side wireless equipment provided in road facilities via road-to-vehicle communication. The assistance information acquiring unit 400 may be configured to acquire, based on the situation information obtained via the aforementioned wireless communications, part of information on the traveling situation of the own vehicle 50, information on the situation in front of the own vehicle 50 and information on the situation behind the own vehicle 50. The various types of information acquired by the assistance information acquiring unit 400 are sent to the autonomous driving ECU 200.

The term "autonomous driving" used in the present disclosure denotes driving for which all of the drive unit control, the brake control and the steering control are automatically performed without any driving operation by a driver (or operator). Accordingly, during autonomous driving, the operating state of the drive unit, the operating state of a brake mechanism and the steering angle of the front wheels are automatically determined. In contrast, the term "manual driving" used in the present disclosure denotes driving for which the driver (or operator) performs an operation (e.g., depressing an accelerator pedal) for the drive unit control, an operation (e.g., depressing a brake pedal) for the brake control and an operation (e.g., turning a steering wheel) for the steering control.

The autonomous driving control unit 210 controls autonomous driving of the vehicle 50 on the basis of the scheduled travel route provided by the navigation device 440 and a variety of situations recognized by the situation recognition unit 220. Specifically, the autonomous driving control unit 210 sends: a drive command value indicative of the operating state of the drive unit (engine and/or electric motor) to the drive unit controller 310; a brake command value indicative of the operating state of the brake mechanism to the brake controller 320; and a steering angle command value indicative of the steering angle of the front wheels to the steering controller 330. Then, the controllers 310, 320 and 330 control their respective control target mechanisms in accordance with the respective command values. It should be noted that the various functions of the autonomous driving control unit 210 may be implemented by artificial intelligence using a learning algorithm such as deep learning.

The driver warning unit 500 includes a driver state detection unit 510 and a warning device 520. The driver state detection unit 510, which includes a detecting device (not shown) such as a camera, has a function of detecting what state the driver is in by detecting the state of the face or head of the driver and the like. The warning device 520 is configured to output a warning to the driver in accordance with the situation of the vehicle 50 or the detection results by the driver state detection unit 510. The warning device 520 may be implemented by one or more devices such as a sound generator (speaker), an image display and a vibration generator that causes vibration of an in-vehicle object (e.g., steering wheel). It should be noted that the driver warning unit 500 may be omitted from the autonomous driving control system 100.

The electric power supply unit 600, which is a unit for supplying electric power to each component in the vehicle 50, includes an electric power supply ECU 610 (electric power supply controller) and an electric power supply circuit 620. The electric power supply circuit 620 includes a plurality of electric power supplies 621, 622. For example, a secondary battery and a fuel cell may be employed as the plurality of electric power supplies 621, 622.

The situation recognition unit 220, which is implemented by the autonomous driving ECU 200, includes a traveling situation recognition unit 222, a front-side recognition unit 224 and a rear-side recognition unit 226. The traveling situation recognition unit 222 has a function of recognizing the traveling situation of the own vehicle 50 using the various types of information and detection values provided by the assistance information acquiring unit 400 and the general sensors 340. The front-side recognition unit 224 recognizes the situation of the objects and the road facilities (traffic lanes, traffic intersections, traffic signals and the like) in front of the own vehicle 50 using the information provided by the front-side detector 410. The rear-side recognition unit 226 recognizes the situation regarding the objects and the road facilities behind the own vehicle 50 using the information provided by the rear-side detector 420. For example, the front-side recognition unit 224 and the rear-side recognition unit 226 may recognize an approaching situation where another object is approaching the own vehicle 50. It should be noted that some or all of the functions of the situation recognition unit 220 may be implemented by one or more separate ECUs from the autonomous driving ECU 200.

The autonomous driving control system 100 includes various electronic devices including the autonomous driving ECU 200. These electronic devices are interconnected via an in-vehicle network such as CAN (Controller Area Network). It should be noted that the configuration of the autonomous driving control system 100 shown in FIG. 1 can also be applied to other embodiments to be described later.

Figure 2:
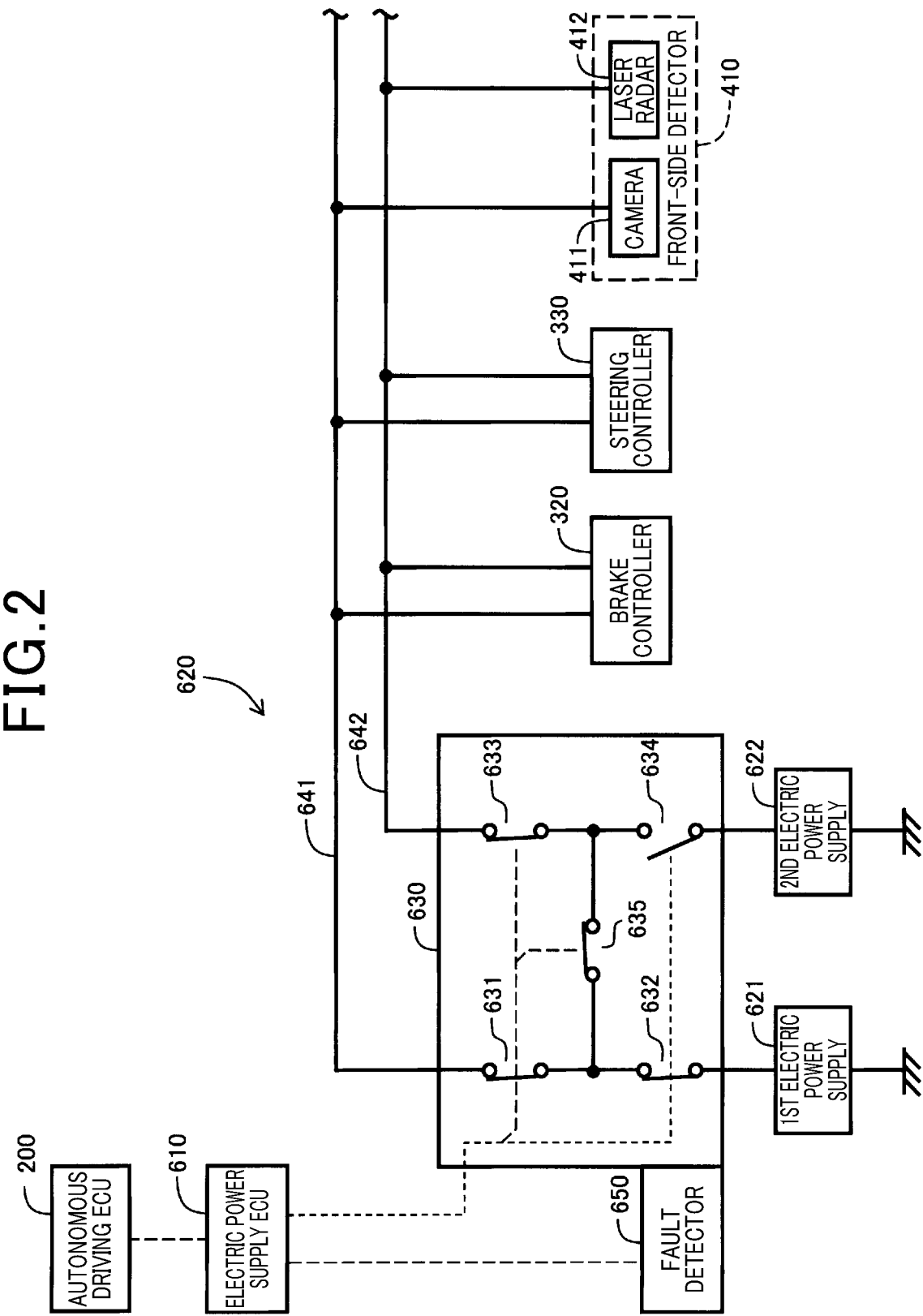
FIG. 2 is an explanatory diagram illustrating the configuration of an electric power supply circuit according to the first embodiment.

As shown in FIG. 2, the electric power supply circuit 620 includes the plurality of electric power supplies 621, 622, a relay device 630 including a plurality of relays 631-635, and electric power supply lines 641, 642 respectively belonging to a plurality of systems. The relays 632 and 631 are connected in this order between an output terminal of the first electric power supply 621 and the first electric power supply line 641. The relays 634 and 633 are connected in this order between an output terminal of the second electric power supply 622 and the second electric power supply line 642. In addition, a node between the two relays 631 and 632 on the first electric power supply 621 side and a node between the two relays 633 and 634 on the second electric power supply 622 side are connected with each other via the relay 635. Since the relay 635 is a relay for connecting the electric power supply lines 641 and 642 of two systems in parallel, it will also be referred to as "parallel-connection relay 635" hereinafter.

The electric power supply lines 641 and 642 of the two systems supply electric power to a plurality of specific accessories. In FIG. 2, there are depicted, as the specific accessories, the brake controller 320, the steering controller 330 and the front-side detector 410. The front-side detector 410 includes a camera 411 and a laser radar 412. The specific accessories are particularly important machines and devices among those for control of autonomous driving. For example, the specific accessories may include at least one of the autonomous driving control unit 210, the situation recognition unit 220, the brake controller 320, the steering controller 330, the front-side detector 410, the rear-side detector 420 and the electric power supply ECU 610. In addition, the term "accessories" denotes auxiliary machines and devices necessary for causing the vehicle 50 to travel with the drive unit (internal combustion engine and/or electric motor) driving the wheels of the vehicle 50. Any accessory other than the specific accessories may be connected to the electric power supply systems shown in FIG. 2 or alternatively to other electric power supply systems. It should be noted that connection of the autonomous driving ECU 200 and the electric power supply ECU 610 to the electric power supply lines 641 and 642 is not shown in FIG. 2. In a normal connection state of the electric power supply circuit 620, the electric power supplies 621 and 622 are connected to the plurality of specific accessories in parallel as shown in FIG. 2. Specifically, in the normal connection state, of the relays 631-635 included in the relay device 630, the relay 634 is in an OFF state whereas the other relays 631-633 and 635 are in an ON state. In addition, in the example shown in FIG. 2, the first electric power supply 621 is a main electric power supply and the second electric power supply 622 is an auxiliary electric power supply; the various accessories are normally supplied with electric power mainly by the first electric power supply 621. Although the two electric power supplies 621 and 622 are included in the electric power supply unit 600 in this embodiment, three or more electric power supplies may be included in the electric power supply unit 600. The same applies to the electric power supply lines 641 and 642. In this case, it is preferable that the number of the electric power supplies be equal to the number of the electric power supply lines.

Each of the brake controller 320 and the steering controller 330 is connected to both the first electric power supply line 641 and the second electric power supply line 642. Therefore, each of the brake controller 320 and the steering controller 330 can be supplied with electric power from both the first electric power supply line 641 and the second electric power supply line 642. The camera 411 of the front-side detector 410 is connected to the first electric power supply line 641, but not connected to the second electric power supply line 642. In contrast, the laser radar 412 of the front-side detector 410 is connected to the second electric power supply line 642, but not connected to the first electric power supply line 641. In other words, the specific accessories may include accessories connected to both the electric power supply lines 641 and 642 of the two systems and accessories connected to only one of the electric power supply lines 641 and 642. The accessories connected to both the electric power supply lines 641 and 642 of the two systems can be supplied with electric power from both the electric power supply lines 641 and 642 of the two systems; therefore, when a fault or malfunction has occurred in one of the two systems, the accessories can still be continuously supplied with electric power. In contrast, the accessories connected to only one of the electric power supply lines 641 and 642 of the two systems cannot be supplied with electric power and thus become unable to operate when a fault or malfunction has occurred in that one of the two systems to which the accessories are connected. In this regard, according to the present embodiment, the camera 411 and the laser radar 412 of the front-side detector 410 are respectively connected to the electric power supply lines 641 and 642 of different systems. Therefore, the front-side detector 410 can be supplied with electric power from either one of the two systems unless faults or malfunctions occur in both the systems at the same time. Accordingly, the front-side detector 410 can maintain at least part of its function. When a ground fault has occurred somewhere in the electric power supply circuit 620 with both the systems being connected in parallel (i.e., with the relay 635 being in the ON state), there is a possibility that all of the specific accessories cannot be supplied with electric power. Accordingly, it is preferable to turn the relay 635 off when a ground fault has occurred. Alternatively, in preparation for a ground fault, the relay 635 may be turned off in the normal connection state. As above, it is preferable that the specific accessories necessary for control of autonomous driving are parallel-connected to the electric power supply lines 641 and 642 of the two systems that are electrically independent or can be made electrically independent (i.e., the relay 635 can be turned off as needed). Alternatively, it is preferable that the specific accessories having similar functions are respectively connected to the electric power supply lines of different systems that are electrically independent or can be made electrically independent.

The electric power supply ECU 610 has a function of switching the connection state of the relay device 630. It should be noted that although the relay device 630 has the five relays 631-635 in the example shown in FIG. 2, the relay device 630 may have any other suitable configuration. Typically, the relay device 630 may be configured as a circuit including a plurality of relays capable of changing the connection state of the electric power supply circuit 620. A variety of specific examples of the relay device 630 will be described in other embodiments.

The relay device 630 is provided with a fault detector 650 that detects respective fault states of the plurality of relays 631-635. The fault detector 650 is capable of detecting, for each of the relays 631-63, in which one of three states, i.e., "Normal", "Stuck-ON" and "Stuck-OFF", the relay is. Here, the term "Stuck-ON" denotes that the relay is stuck (or fixed) in a closed state; the term "Stuck-OFF" denotes that the relay is stuck in an open state. The detection can be performed by various methods as described below.

(1) Fault Detection Based on Potential Difference Between Two Ends of Relay

Upon the electric power supply ECU 610 issuing an ON command to the relay, if the difference in electric potential between the two ends of the relay is greater than or equal to a given value that is determined according to the resistance of the relay, the relay is determined to be in the Stuck-OFF state. In contrast, upon the electric power supply ECU 610 issuing an OFF command to the relay, if the difference in electric potential between the two ends of the relay is less than the given value that is determined according to the resistance of the relay, the relay is determined to be in the Stuck-ON state. In addition, in this fault detection method, the difference in electric potential between the two ends of the relay may be amplified using a differential amplifier, as disclosed in Japanese Patent Application Publication No. JP2001035335A.

(2) Fault Detection Based on Relay Current

Upon the electric power supply ECU 610 issuing the OFF command to the relay, if the relay current (i.e., electric current flowing through the relay) is higher than or equal to a given value, the relay is determined to be in the Stuck-ON state. In contrast, upon the electric power supply ECU 610 issuing the ON command to the relay, if the relay current is lower than the given value, the relay is determined to be in the Stuck-OFF state. Alternatively, upon intentionally changing the resistance of a load, if the amount of change in the relay current is less than a given value, the relay is determined to be in the Stuck-OFF state.

(3) Fault Detection Based on Change in Relay Current or Potential Difference Between Two Ends of Relay During ON/OFF of Relay The Stuck-OFF and Stuck-ON states are determined based on the change in the relay current or the difference in electric potential between the two ends of the relay upon the electric power supply ECU 610 sequentially issuing the ON command and the OFF command or sequentially issuing the OFF command and the ON command to the relay.

(4) Fault Detection Based on Change in Relay Current or Potential Difference Between Two Ends of Relay with Load Change The Stuck-OFF and Stuck-ON states are determined, respectively upon issuance of the OFF command and issuance of the ON command, based on the change in the relay current or the difference in electric potential between the two ends of the relay with change in a load.

The methods of detecting relay faults by the fault detector 650 are not limited to the above methods. That is to say, other methods can also be used. Moreover, the electric power supply circuit 620 shown in FIG. 2 may be provided with an overcurrent protection circuit such as a fuse, and/or with an overvoltage protection circuit. Furthermore, a DC-DC converter may be provided for adjusting the voltages of the power supplies.

Figure 3:
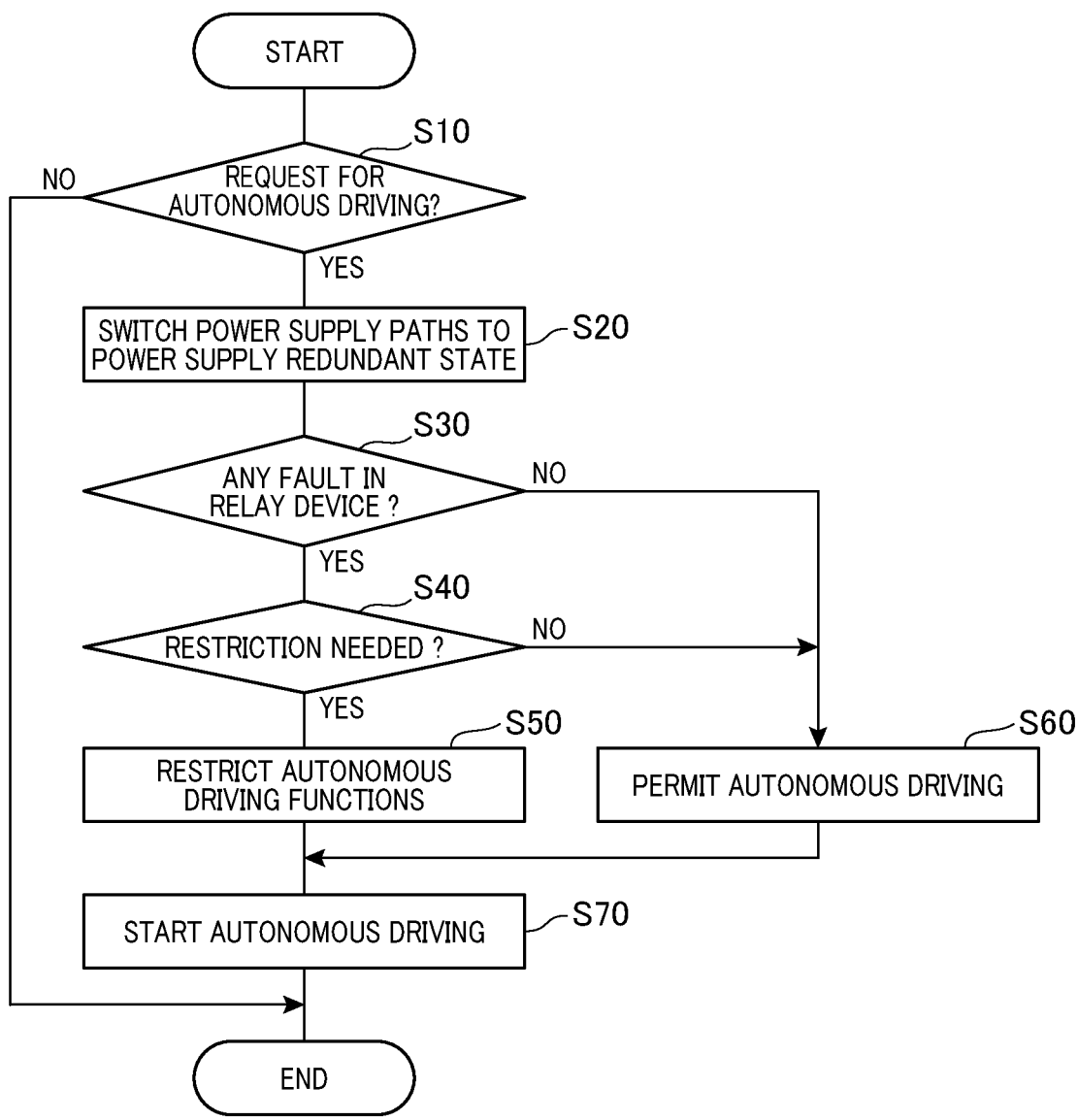
FIG. 3 is a flow chart illustrating steps of a relay state checking process for autonomous driving according to the first embodiment.

FIG. 3 shows a relay state checking process for autonomous driving according to the present embodiment. This process is repeatedly performed at predetermined intervals by the autonomous driving control unit 210 during operation of the vehicle 50.

In step S10, a determination is made as to whether a request for autonomous driving has been made by the driver. If no request for autonomous driving has been made, the process shown in FIG. 3 is directly terminated. In contrast, if the request for autonomous driving has been made, the process proceeds to step S20.

In step S20, for autonomous driving, the electric power supply paths of the specific accessories are switched to an electric power supply redundant state.

Here, the term "electric power supply redundant state" denotes a state where the specific accessories can be supplied with electric power from at least one of the electric power supplies even when a short circuit, a Stuck-ON or Stuck-OFF state has occurred in any of the plurality of electric power supplies 621 and 622, the plurality of electric power supply lines 641 and 642 and the loads connected to the electric power supply lines 641 and 642. In the configuration example of the electric power supply circuit 620 shown in FIG. 2, the electric power supply redundant state is a state where all of the five relays 631-635 are in the ON state. In such a state, the specific accessories can be supplied with electric power from one of the two electric power supplies 621 and 622 even when, for example, a fault has occurred in a part of the relays 631-635.

In addition, step S20 may be omitted maintaining the normal connection state of the electric power supply circuit 620. Alternatively, a state of the two electric power supplies 621 and 622 being connected with each other may be continuously maintained from when manual driving is performed. In the former case (i.e., the case of maintaining the normal connection state of the electric power supply circuit 620), the electric power supply paths of the specific accessories may be switched to the electric power supply redundant state upon occurrence of a fault somewhere in the electric power supply circuit 620 during autonomous driving. In the latter case (i.e., the case of continuously maintaining the state of the two electric power supplies 621 and 622 being connected with each other from when manual driving is performed), the electric power supply redundant state (e.g., two electric power supplies and two systems) may be constantly maintained regardless of whether autonomous driving or manual driving is performed; moreover, upon occurrence of a fault somewhere in the electric power supply circuit 620, the failed system may be disconnected by the relay device 630 from the normal system.

In step S30, the fault detector 650 detects whether any fault has occurred in the relay device 630.

In the example shown in FIG. 2, if a Stuck-ON or Stuck-OFF state has been detected in at least one of the plurality of relays 631-635 of the relay device 630, it is determined that a fault has occurred in the relay device 630.

If no fault has occurred in the relay device 630, the process proceeds to step S60 to permit autonomous driving. In contrast, if any fault has occurred in the relay device 630, the process proceeds to step S40.

In addition, the fault detection of the relay device 630 is not limited to this timing, but may be performed at any timing during the driving of the vehicle 50.

In step S40, a determination is made as to whether the fault of the relay device 630 corresponds to a specific fault pattern that necessitates restricting the function of autonomous driving.

If the fault of the relay device 630 does not correspond to a specific fault pattern, the process proceeds to step S60 to permit autonomous driving. In contrast, if the fault of the relay device 630 corresponds to a specific fault pattern, the process proceeds to step S50 to restrict part of the autonomous driving function.

FIG. 4 shows an example of the state of the relay device 630 not corresponding to a specific fault pattern (i.e., the state of the relay device 630 corresponding to a pattern permitting autonomous driving without any control function restriction).

Twenty patterns shown in FIG. 4 each represent a state of the relay device 630 sufficient to permit autonomous driving without restricting the function of autonomous driving. These patterns allow the specific accessories to be supplied with electric power from at least one of the electric power supplies even when a primary fault has occurred somewhere in either one of the electric power supply systems. Consequently, it is possible to permit fully autonomous driving (i.e., functionally-unrestricted autonomous driving) without any restriction on the autonomous driving.

Each of the following fault patterns is a "specific fault pattern" that necessitates restricting the function of autonomous driving.

(1) In the case where a Stuck-OFF state has occurred in at least one of the relays 631 and 633 at output ends of the relay device 630, the electric power supply paths of the specific accessories are not in the electric power supply redundant state. In this case, upon occurrence of a fault in a load-side circuit in operation, it becomes impossible to supply electric power to the specific accessories. Therefore, this case corresponds to a "specific fault pattern". In addition, in this case, it may become impossible for the vehicle 50 to travel.

(2) In the case where a Stuck-OFF state has occurred in at least one of the relays 632 and 634 at output ends of the electric power supplies 621 and 622, the electric power supply paths of the specific accessories are not in the electric power supply redundant state. In this case, upon occurrence of a fault in the electric power supplies in operation, it becomes impossible to supply electric power to the specific accessories. Therefore, this case also corresponds to a "specific fault pattern".

(3) In the case where a Stuck-ON state has occurred in the parallel-connection relay 635, it is impossible to disconnect the electric power supply lines 641 and 642 of the two systems from each other. Consequently, the systems are down upon occurrence of a short circuit in any one of the specific accessories and the electric power supply lines. Therefore, this case also corresponds to a "specific fault pattern".

In addition, the following patterns, which are not shown in FIG. 4, are also patterns permitting autonomous driving.

(1) Patterns Symmetric to Those Shown in FIG. 4 Regarding Faults of Relays 631-635

For example, Pattern No. 3 in FIG. 4 is (Normal, Normal, Normal, Stuck-ON, Normal). The pattern symmetric to Pattern No. 3 is (Normal, Stuck-ON, Normal, Normal, Normal), which is not shown in the figures.

(2) Patterns Functionally Equivalent to Those Shown in FIG. 4

For example, Pattern No. 10 in FIG. 4 is (Normal, Stuck-ON, Normal, Stuck-ON, Stuck-OFF). The pattern functionally equivalent to Pattern No. 10 is (Normal, Normal, Stuck-ON, Normal, Stuck-OFF), which is also not shown in the figures.

The patterns that permit functionally-unrestricted autonomous driving satisfy both the following requirements: (i) being capable of setting the parallel-connection relay 635 to the OFF state; and (ii) being capable of connecting the plurality of electric power supplies 621 and 622 to the electric power supply lines 641 and 642 in parallel. In contrast, the "specific fault patterns" that necessitate restricting the function of autonomous driving cannot satisfy at least one of the following requirements: (i) being capable of setting the parallel-connection relay 635 to the OFF state; and (ii) being capable of connecting the plurality of electric power supplies 621 and 622 to the electric power supply lines 641 and 642 in parallel. In the case of a "specific fault pattern", upon occurrence of an abnormality somewhere in the electric power supply circuit 620, it may become impossible to supply electric power to the specific accessories; therefore, it is preferable to have part of the function of autonomous driving restricted in advance.

Referring back to FIG. 3, in step S50, part of the function of autonomous driving is restricted.

For example, restricting the function of autonomous driving may include at least one of: (a) entrusting part of the control function of autonomous driving to operation by the driver; and (b) lowering the upper limit of the vehicle speed during autonomous driving below the upper limit in a normal state (i.e., a state without any function restriction) of the autonomous driving. By performing (a), it is possible to prevent, with the operation by the driver, unstable vehicle behavior even when no electric power is supplied to those specific accessories provided for the entrusted part of the control function. On the other hand, by performing (b), it is possible to improve safety of occupants in the vehicle even if a fault or malfunction of the electric power supply systems occurs during autonomous driving. Moreover, the part of the control function of autonomous driving entrusted to the driver may be, for example, part of the drive unit control, the steering control and the brake control. In addition, it is suitably determined, in terms of safety, electric power consumption, fuel economy and the like, how to select the part of the control function of autonomous driving to be entrusted to the driver.

In step S70, the autonomous driving control unit 210 starts autonomous driving of the vehicle 50.

In addition, it is preferable to return the electric power supply systems to the normal connection state upon termination of the autonomous driving.

As described above, in the present embodiment, when a fault corresponding to a specific fault pattern has occurred in the relay device 630, part of the control function of autonomous driving is restricted. Consequently, even if a fault or malfunction occurs in the electric power supply systems during autonomous driving, it is still possible to reduce the possibility of the autonomous driving causing unstable vehicle behavior.

In addition, in the present embodiment, the relay fault determination and the autonomous driving function restriction are performed prior to the start of autonomous driving. As an alternative, the relay fault determination and the autonomous driving function restriction may be performed during autonomous driving.

Second Embodiment

As shown in FIG. 5, in the electric power supply systems according to the second embodiment, there is added, as a specific accessory (i.e., an accessory necessary for autonomous driving), a starter 710 for an internal combustion engine 720. The other configurations of the vehicle 50 and the process flow shown in FIG. 3 are the same as in the first embodiment.

The starter 710 is connected to the first electric power supply line 641. In the case where the vehicle 50 has an idle stop function (or idle reduction function) and this function is also included in the subjects of autonomous driving, the starter 710 is one of the specific accessories necessary for autonomous driving. This is because the starter 710 is required to restart the internal combustion engine 720 after the internal combustion engine 720 is stopped by the idle stop function. In addition, the idle stop function constitutes part of the control function of autonomous driving.

With the above configuration, the idle stop function (part of the control function of autonomous driving) may be inhibited during autonomous driving upon occurrence of a fault pattern (specific fault pattern) which makes it impossible to perform a voltage drop protection of the second electric power supply line 642 that is not connected with the starter 710. In this case, neither the brake control by the brake controller 320 nor the steering control by the steering controller 330 is inhibited. This state corresponds to the restricted autonomous driving control in which part of the control function of autonomous driving is restricted. Consequently, by temporality excluding the idle stop function, which is irrelevant to driving safety, from the subjects of autonomous driving without entrusting the autonomous driving control relevant to driving safety to the driver, it is possible to maintain a state where the other specific accessories necessary for autonomous driving control are used for autonomous driving.

For example, in the above-described patterns shown in FIG. 4, by keeping the parallel-connection relay 635 is in the OFF state during operation of the starter 710, it is possible to prevent a voltage drop from occurring in the second electric power supply line 642 that is not connected with the starter 710, thereby allowing the other specific accessories to be supplied with electric power via the power supply line 642. Therefore, the idol stop function may be permitted during autonomous driving. In contrast, in a fault pattern that does not allow the parallel-connection relay 635 to be in the OFF state (a pattern where the relay 635 is in the Stuck-ON state), a large voltage drop occurs in the second electric power supply line 642. Therefore, it is preferable to inhibit the idle stop function.

Moreover, instead of being immediately inhibited in step S50 of FIG. 3, the idle stop function may be inhibited only upon occurrence of a trouble in the electric power supply systems or the loads thereof due to a restart of the engine after an idle stop. For example, when there is no history of starting the engine by the starter 710 during the current trip, the starter 710 may be allowed to start the engine once without inhibiting an idle stop; then, idle stops may be permitted during autonomous driving upon conforming that the engine could be started by the starter 710 without any problem.

In addition, the idle stop function may be inhibited due to a fault of the relay device 630 as described above not only during autonomous driving but also during manual driving.

Considering the above-described first and second embodiments together, it can be concluded that the autonomous driving control restricted due to a fault of the relay device 630 may include at least one of: (a) entrusting part of the control function of autonomous driving to operation by the driver; (b) lowering the upper limit of the vehicle speed during autonomous driving below the upper limit in the normal state of the autonomous driving; and (c) inhibiting an idle stop of the vehicle 50. By performing such a restricted autonomous driving control, even if a fault or malfunction occurs in the electric power supply systems during autonomous driving, it is still possible to reduce the possibility of the autonomous driving causing unstable vehicle behavior.

Third Embodiment

As shown in FIG. 6, in the third embodiment, the relay 634 of the relay device 630 is omitted from the configuration shown in FIG. 5 of the second embodiment. The other configurations and the process flow shown in FIG. 3 are the same as in the second embodiment. In addition, the configuration of including no starter 710 as shown in FIG. 2 of the first embodiment may be applied to the specific accessories according to the third embodiment. The same also applies to other embodiments to be described later.

FIG. 7 shows an example of the relay state that permits the functionally-unrestricted autonomous driving according to the third embodiment.

As shown in FIG. 7, as in the first and second embodiments, the relay state that permits the functionally-unrestricted autonomous driving in the third embodiment corresponds to patterns that satisfy both the following requirements:
(i) being capable of setting the parallel-connection relay 635 to the OFF state; and
(ii) being capable of connecting the plurality of electric power supplies 621 and 622 to the electric power supply lines 641 and 642 in parallel. In contrast, the specific fault patterns that necessitate restricting the function of autonomous driving cannot satisfy at least one of the above requirements (i) and (ii).

Fourth Embodiment

As shown in FIG. 8, in the fourth embodiment, the relay 633 of the relay device 630 is omitted from the configuration shown in FIG. 5 of the second embodiment. The other configurations and the process flow shown in FIG. 3 are the same as in the second embodiment.

FIG. 9 shows an example of the relay state that permits the functionally-unrestricted autonomous driving according to the fourth embodiment.

As shown in FIG. 9, as in the first and second embodiments, the relay state that permits the functionally-unrestricted autonomous driving in the fourth embodiment corresponds to patterns that satisfy both the following requirements:
(i) being capable of setting the parallel-connection relay 635 to the OFF state; and
(ii) being capable of connecting the plurality of electric power supplies 621 and 622 to the electric power supply lines 641 and 642 in parallel. In contrast, the specific fault patterns that necessitate restricting the function of autonomous driving cannot satisfy at least one of the above requirements (i) and (ii).

Fifth Embodiment

Figure 10A:
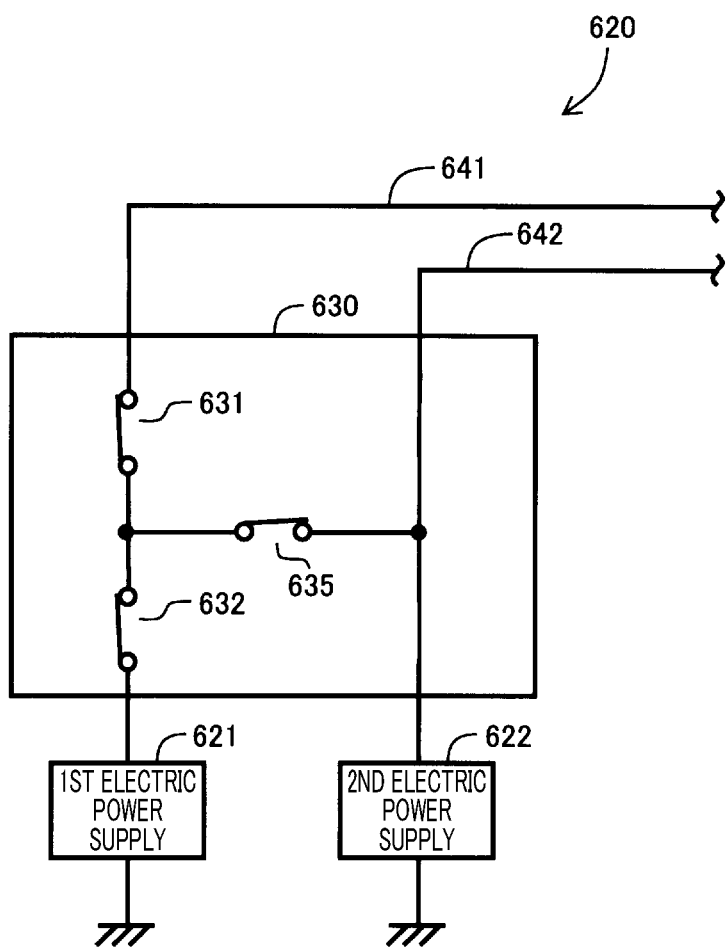
FIG. 10A is an explanatory diagram illustrating an electric power supply circuit according to a fifth embodiment.

As shown in FIG. 10A, in the fifth embodiment, both the relays 633 and 634 of the relay device 630 are omitted from the configuration shown in FIG. 5 of the second embodiment. The other configurations and the process flow shown in FIG. 3 are the same as in the second embodiment. It should be noted that for the sake of simplicity, other components than the electric power supply circuit 620 are not shown in FIG. 10A. The same applies to other embodiments shown in FIG. 11A and subsequent figures.

FIG. 10B shows an example of the relay state that permits the functionally-unrestricted autonomous driving according to the fifth embodiment.

As shown in FIG. 10B, as in the first and second embodiments, the relay state that permits the functionally-unrestricted autonomous driving in the fifth embodiment corresponds to patterns that satisfy both the following requirements: (i) being capable of setting the parallel-connection relay 635 to the OFF state; and (ii) being capable of connecting the plurality of electric power supplies 621 and 622 to the electric power supply lines 641 and 642 in parallel. In contrast, the specific fault patterns that necessitate restricting the function of autonomous driving cannot satisfy at least one of the above requirements (i) and (ii).

Sixth Embodiment

Figure 11A:
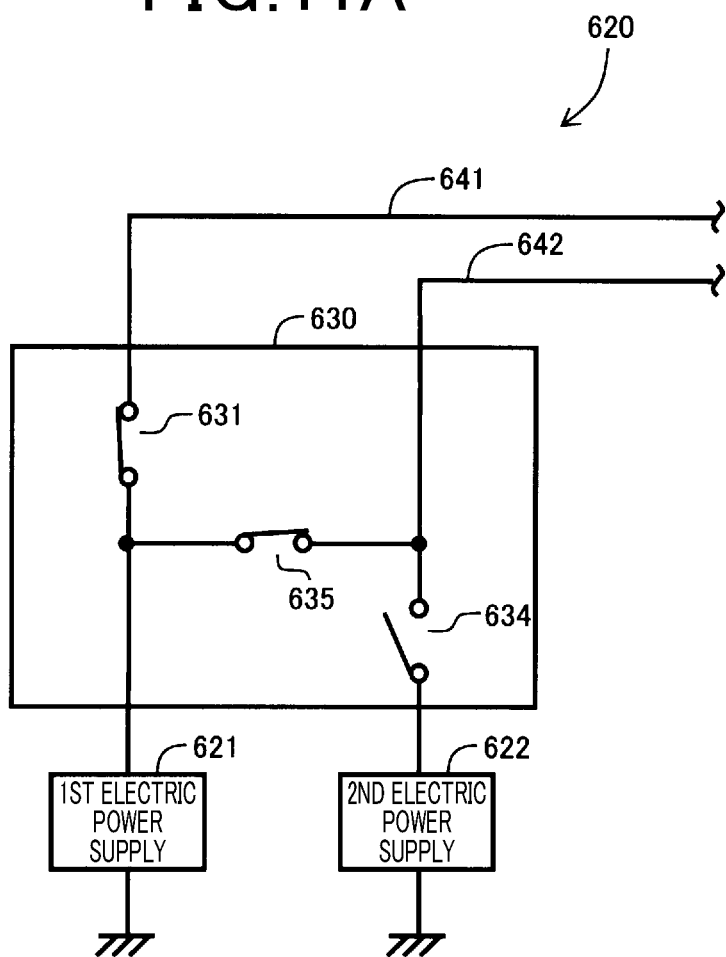
FIG. 11A is an explanatory diagram illustrating the configuration of an electric power supply circuit according to a sixth embodiment.

As shown in FIG. 11A, in the sixth embodiment, both the relays 632 and 633 of the relay device 630 are omitted from the configuration shown in FIG. 5 of the second embodiment. The other configurations and the process flow shown in FIG. 3 are the same as in the second embodiment.

FIG. 11B shows an example of the relay state that permits the functionally-unrestricted autonomous driving according to the sixth embodiment.

As shown in FIG. 11B, as in the first and second embodiments, the relay state that permits the functionally-unrestricted autonomous driving in the sixth embodiment corresponds to patterns that satisfy both the following requirements:
(i) being capable of setting the parallel-connection relay 635 to the OFF state; and
(ii) being capable of connecting the plurality of electric power supplies 621 and 622 to the electric power supply lines 641 and 642 in parallel. In contrast, the specific fault patterns that necessitate restricting the function of autonomous driving cannot satisfy at least one of the above requirements (i) and (ii).

Seventh Embodiment

Figure 12A:
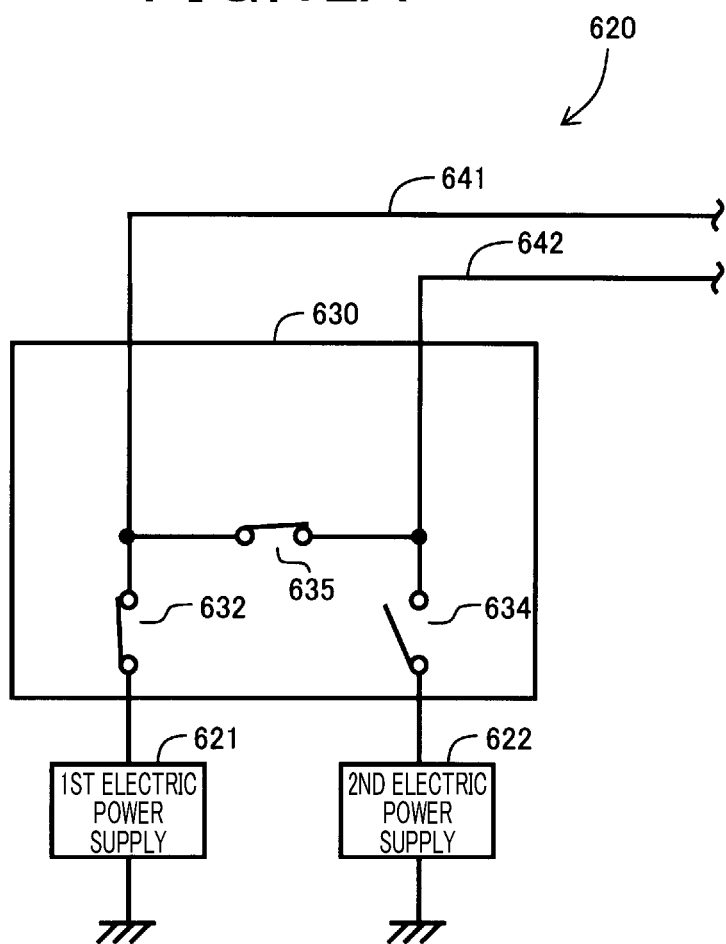
FIG. 12A is an explanatory diagram illustrating the configuration of an electric power supply circuit according to a seventh embodiment.

As shown in FIG. 12A, in the seventh embodiment, both the relays 631 and 633 of the relay device 630 are omitted from the configuration shown in FIG. 5 of the second embodiment. The other configurations and the process flow shown in FIG. 3 are the same as in the second embodiment.

FIG. 12B shows an example of the relay state that permits the functionally-unrestricted autonomous driving according to the seventh embodiment.

As shown in FIG. 12B, as in the first and second embodiments, the relay state that permits the functionally-unrestricted autonomous driving in the seventh embodiment corresponds to patterns that satisfy both the following requirements:
(i) being capable of setting the parallel-connection relay 635 to the OFF state; and
(ii) being capable of connecting the plurality of electric power supplies 621 and 622 to the electric power supply lines 641 and 642 in parallel. In contrast, the specific fault patterns that necessitate restricting the function of autonomous driving cannot satisfy at least one of the above requirements (i) and (ii).

Eighth Embodiment

As shown in FIG. 13A, in the eighth embodiment, both the relays 632 and 634 of the relay device 630 are omitted from the configuration shown in FIG. 5 of the second embodiment. The other configurations and the process flow shown in FIG. 3 are the same as in the second embodiment.

FIG. 13B shows an example of the relay state that permits the functionally-unrestricted autonomous driving according to the eighth embodiment.

As shown in FIG. 13B, as in the first and second embodiments, the relay state that permits the functionally-unrestricted autonomous driving in the eighth embodiment corresponds to patterns that satisfy both the following requirements:

(i) being capable of setting the parallel-connection relay 635 to the OFF state; and
(ii) being capable of connecting the plurality of electric power supplies 621 and 622 to the electric power supply lines 641 and 642 in parallel. In contrast, the specific fault patterns that necessitate restricting the function of autonomous driving cannot satisfy at least one of the above requirements (i) and (ii).

Ninth Embodiment

Figures 14A, 14B:
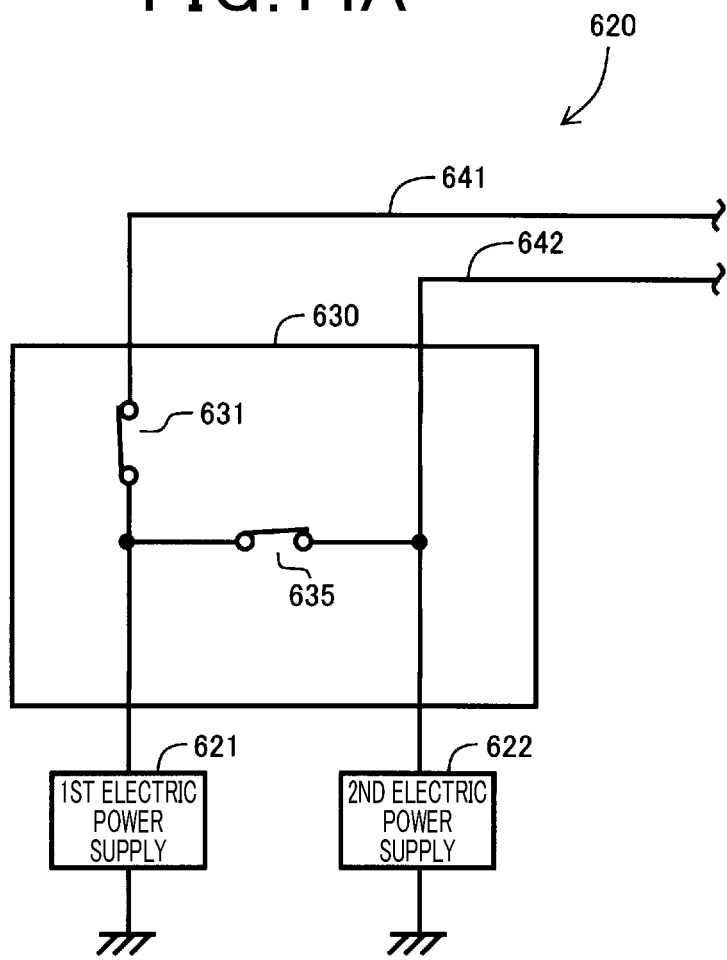
FIG. 14A is an explanatory diagram illustrating the configuration of an electric power supply circuit according to a ninth embodiment.
FIG. 14B is a tabular representation illustrating relay states that permit autonomous driving according to the ninth embodiment.

As shown in FIG. 14A, in the ninth embodiment, the three relays 632, 633 and 634 of the relay device 630 are omitted from the configuration shown in FIG. 5 of the second embodiment. The other configurations and the process flow shown in FIG. 3 are the same as in the second embodiment.

FIG. 14B shows an example of the relay state that permits the functionally-unrestricted autonomous driving, according to the ninth embodiment.

As shown in FIG. 14B, as in the first and second embodiments, the relay state that permits the functionally-unrestricted autonomous driving in the ninth embodiment corresponds to patterns that satisfy both the following requirements:
(i) being capable of setting the parallel-connection relay 635 to the OFF state; and
(ii) being capable of connecting the plurality of electric power supplies 621 and 622 to the electric power supply lines 641 and 642 in parallel. In contrast, the specific fault patterns that necessitate restricting the function of autonomous driving cannot satisfy at least one of the above requirements (i) and (ii).

Tenth Embodiment

Figures 15A, 15B:
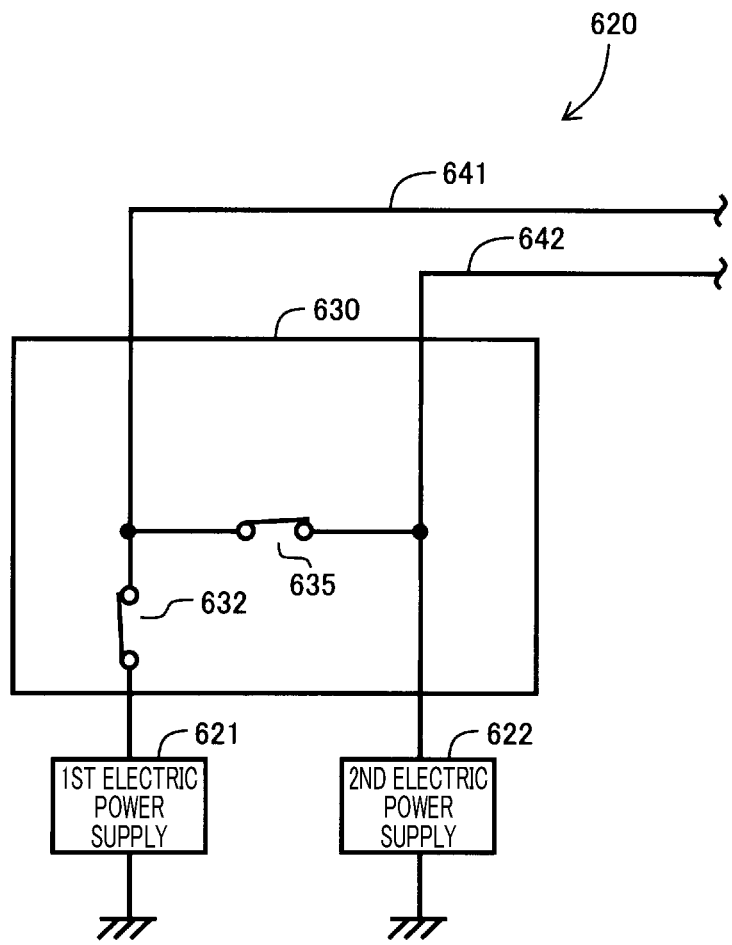
FIG. 15A is an explanatory diagram illustrating the configuration of an electric power supply circuit according to a tenth embodiment.
FIG. 15B is a tabular representation illustrating relay states that permit autonomous driving according to the tenth embodiment.

As shown in FIG. 15A, in the tenth embodiment, the three relays 631, 633 and 634 of the relay device 630 are omitted from the configuration shown in FIG. 5 of the second embodiment. The other configurations and the process flow shown in FIG. 3 are the same as in the second embodiment.

FIG. 15B shows an example of the relay state that permits the functionally-unrestricted autonomous driving according to the tenth embodiment.

As shown in FIG. 15B, as in the first and second embodiments, the relay state that permits the functionally-unrestricted autonomous driving in the tenth embodiment corresponds to patterns that satisfy both the following requirements:
(i) being capable of setting the parallel-connection relay 635 to the OFF state; and
(ii) being capable of connecting the plurality of electric power supplies 621 and 622 to the electric power supply lines 641 and 642 in parallel. In contrast, the specific fault patterns that necessitate restricting the function of autonomous driving cannot satisfy at least one of the above requirements (i) and (ii).

Eleventh Embodiment

Figures 16A, 16B:
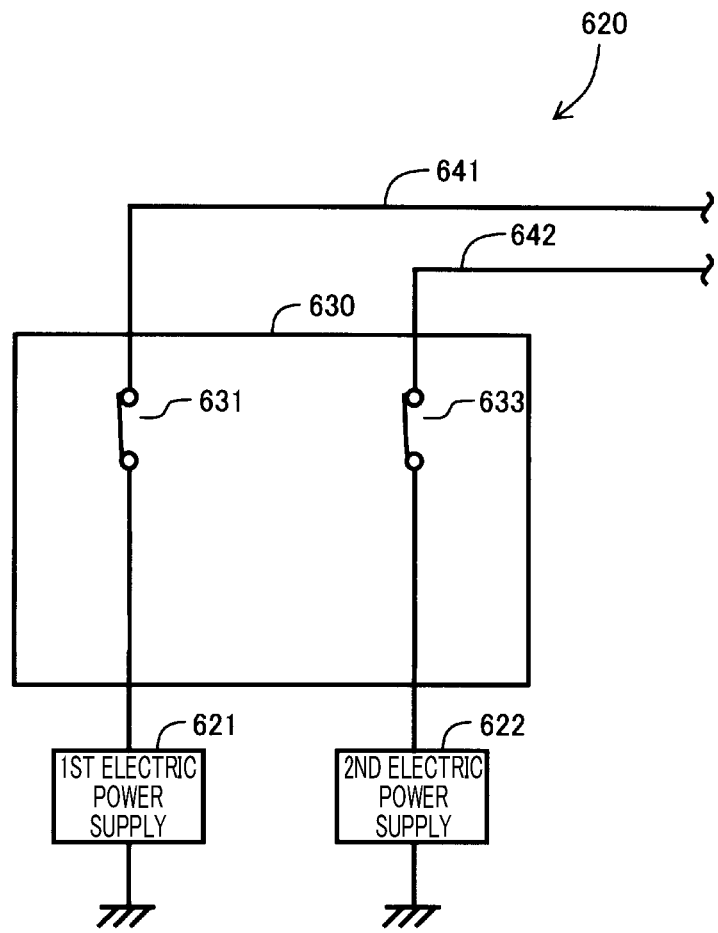
FIG. 16A is an explanatory diagram illustrating the configuration of an electric power supply circuit according to an eleventh tenth embodiment.
FIG. 16B is a tabular representation illustrating relay states that permit autonomous driving according to the eleventh embodiment.

As shown in FIG. 16A, in the eleventh embodiment, the three relays 632, 634 and 635 of the relay device 630 are omitted from the configuration shown in FIG. 5 of the second embodiment. The other configurations and the process flow shown in FIG. 3 are the same as in the second embodiment.

It should be noted that the eleventh embodiment is different from the above-described first to tenth embodiments in that the parallel-connection relay 635 is omitted.

FIG. 16B shows an example of the relay state that permits the functionally-unrestricted autonomous driving according to the eleventh embodiment.

As shown in FIG. 16B, in the eleventh embodiment, the relay state that permits the functionally-unrestricted autonomous driving corresponds to patterns that satisfy the requirement of being capable of supplying electric power from the plurality of electric power supplies 621 and 622 to the electric power supply lines 641 and 642. In contrast, the specific fault patterns that necessitate restricting the function of autonomous driving are such that at least one of the electric power supply lines 641 and 642 cannot be supplied with electric power.

Twelfth Embodiment

Figures 17A, 17B:
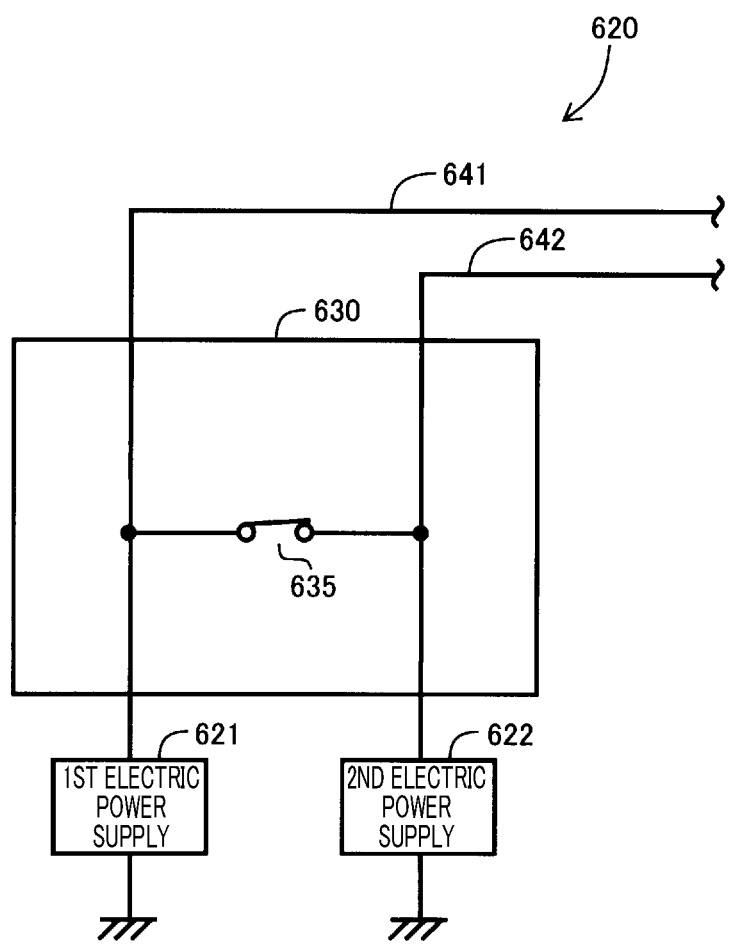
FIG. 17A is an explanatory diagram illustrating the configuration of an electric power supply circuit according to a twelfth embodiment.
FIG. 17B is a tabular representation illustrating relay states that permit autonomous driving according to the twelfth embodiment.

As shown in FIG. 17A, in the twelfth embodiment, the four relays 631, 632, 633 and 634 of the relay device 630 are omitted from the configuration shown in FIG. 5 of the second embodiment. The other configurations and the process flow shown in FIG. 3 are the same as in the second embodiment.

FIG. 17B shows an example of the relay state that permits the functionally-unrestricted autonomous driving according to the twelfth embodiment.

As shown in FIG. 17B, as in the first and second embodiments, the relay state that permits the functionally-unrestricted autonomous driving in the twelfth embodiment corresponds to patterns that satisfy both the following requirements:
(i) being capable of setting the parallel-connection relay 635 to the OFF state; and
(ii) being capable of connecting the plurality of electric power supplies 621 and 622 to the electric power supply lines 641 and 642 in parallel. In contrast, the specific fault patterns that necessitate restricting the function of autonomous driving cannot satisfy at least one of the above requirements (i) and (ii).

Thirteenth Embodiment

Figures 18A, 18B:
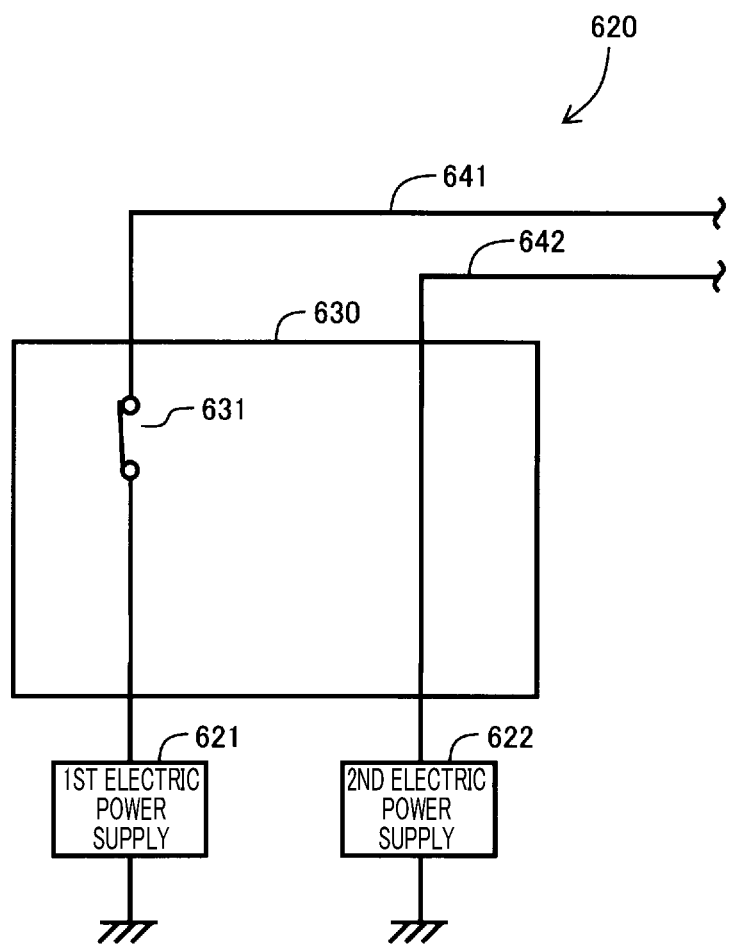
FIG. 18A is an explanatory diagram illustrating the configuration of an electric power supply circuit according to a thirteenth embodiment.
FIG. 18B is a tabular representation illustrating relay states that permit autonomous driving according to the thirteenth embodiment.

As shown in FIG. 18A, in the thirteenth embodiment, the four relays 632, 633, 634 and 635 of the relay device 630 are omitted from the configuration shown in FIG. 5 of the second embodiment. The other configurations and the process flow shown in FIG. 3 are the same as in the second embodiment.

It should be noted that omission of the parallel-connection relay 635 is common to the thirteenth embodiment and the above-described eleventh embodiment (see FIG. 16A).

FIG. 18B shows an example of the relay state that permits the functionally-unrestricted autonomous driving according to the thirteenth embodiment.

As shown in FIG. 18B, in the thirteenth embodiment, the relay state that permits the functionally-unrestricted autonomous driving corresponds to patterns that satisfy the requirement of being capable of supplying electric power from the plurality of electric power supplies 621 and 622 to the electric power supply lines 641 and 642. In contrast, the specific fault patterns that necessitate restricting the function of autonomous driving are such that at least one of the electric power supply lines 641 and 642 cannot be supplied with electric power.

While the above particular embodiments have been shown and described, it will be understood by those skilled in the art that various modifications, changes, and improvements may be made without departing from the spirit of the present disclosure.

For example, the configurations described in the above embodiments may be partially omitted or altered as necessary.

Moreover, some of the steps of FIG. 3 may be omitted as necessary. The execution order of the steps of FIG. 3 may be changed as necessary.

What is claimed is:

1. An autonomous driving control system configured to perform autonomous driving of a vehicle, the autonomous driving control system comprising:
    an electric power supply circuit including a plurality of electric power supplies, electric power supply lines respectively belonging to a plurality of systems and a relay device including a plurality of relays, the electric power supply lines being connectable to the electric power supplies to supply electric power to specific accessories of the vehicle, the relay device being configured to change a connection state between the electric power supplies and the electric power supply lines;
    a fault detector configured to detect a fault state of the relay device, wherein the detection of the fault state includes at least one of:
        (a) determining, for each of the relays of the relay device, whether a potential difference between two ends of the relay is equal to or greater than a predetermined potential difference value;
        (b) determining, for each of the relays of the relay device, whether a relay current flowing through the relay is equal to or greater than a predetermined current value;
        (c) determining, for each of the relays of the relay device, a change in the relay current or in the potential difference between the two ends of the relay during ON/OFF operation of the relay; and
        (d) determining, for each of the relays of the relay device, a change in the relay current or in the potential difference between the two ends of the relay with a change in a load;
    an electric power supply controller configured to control the electric power supply circuit; and
    an autonomous driving control unit having an electronic control unit (ECU), the autonomous driving control unit being provided to control the autonomous driving of the vehicle,
    wherein
    the autonomous driving control unit is configured to perform, upon detection by the fault detector of occurrence of a fault corresponding to a specific fault pattern in the relay device, a restricted autonomous driving control in which part of a control function of the autonomous driving is restricted compared to a normal state when no fault corresponding to the specific fault pattern is detected, the restricted autonomous driving including lowering an upper limit of the vehicle speed during autonomous driving below the upper limit in the normal state.

2. The autonomous driving control system as set forth in claim 1, wherein the restricted autonomous driving control further includes at least one of: (a) entrusting the part of the control function to operation by a driver of the vehicle; and (b) inhibiting an idle stop of the vehicle.

3. The autonomous driving control system as set forth in claim 2, wherein one of the plurality of relays in the relay device is a parallel-connection relay for connecting the electric power supplies to the electric power supply lines in parallel, and
    the specific default pattern is a pattern which cannot satisfy at least one of the following requirements: (i) being capable of setting the parallel-connection relay to an OFF state; and (ii) being capable of connecting the electric power supplies to the electric power supply lines in parallel.

4. The autonomous driving control system as set forth in claim 1, wherein one of the plurality of relays in the relay device is a parallel-connection relay for connecting the electric power supplies to the electric power supply lines in parallel, and
    the specific default pattern is a pattern which cannot satisfy at least one of the following requirements: (i) being capable of setting the parallel-connection relay to an OFF state; and (ii) being capable of connecting the electric power supplies to the electric power supply lines in parallel.

5. The autonomous driving control system as set forth in claim 1, wherein:
    the plurality of electric power supplies includes a first electric power supply and a second electric power supply,
    the plurality of relays includes a first relay and a second relay on a first electric power supply side, a third relay and a fourth relay on a second electric power supply side, and a fifth relay connecting two of the electric power supply lines of two of the plurality of systems in parallel, the second relay and the first relay connected in this order between an output terminal of the first electric power supply and a first power supply line of the electric power supply lines, the fourth relay and the third relay connected in this order between an output terminal of the second electric power supply and a second power supply line of the electric power supply lines, the fifth relay connecting the first electric power supply line and the second electric power supply line in parallel, and
    the specific fault pattern includes one of:
        (a) a stuck-OFF state exists in at least one of the first relay and the third relay at output ends of the relay device;
        (b) a stuck-OFF state exists in at least one of the second relay and the fourth relay at output ends of the first electric power supply and the second electric power supply; and
        (c) a stuck-ON state occurs in the fifth relay.

* * * * *